United States Patent
Lin et al.

(10) Patent No.: US 10,513,157 B2
(45) Date of Patent: Dec. 24, 2019

(54) CONNECTION ASSEMBLY FOR AN AIR MAINTENANCE TIRE

(71) Applicant: The Goodyear Tire & Rubber Company, Akron, OH (US)

(72) Inventors: Cheng-Hsiung Lin, Hudson, OH (US); Sagar Dilip Bafana, Akron, OH (US); Robin Lamgaday, Wadsworth, OH (US)

(73) Assignee: The Goodyear Tire & Rubber Company, Akron, OH (US)

( * ) Notice: Subject to any disclaimer, the term of this patent is extended or adjusted under 35 U.S.C. 154(b) by 233 days.

(21) Appl. No.: 15/784,381

(22) Filed: Oct. 16, 2017

(65) Prior Publication Data

US 2018/0104995 A1    Apr. 19, 2018

Related U.S. Application Data

(60) Provisional application No. 62/410,029, filed on Oct. 19, 2016.

(51) Int. Cl.
*B60C 23/12*    (2006.01)
*F16L 47/04*    (2006.01)
(Continued)

(52) U.S. Cl.
CPC ............ *B60C 23/12* (2013.01); *F16L 19/065* (2013.01); *F16L 43/00* (2013.01); *F16L 47/04* (2013.01)

(58) Field of Classification Search
CPC ........ F16L 47/04; B60C 23/004; B60C 23/12; B60C 29/005
(Continued)

(56) References Cited

U.S. PATENT DOCUMENTS

| 1,050,886 A | 1/1913 | Wetherell |
| 1,134,361 A | 4/1915 | Wetherell |

(Continued)

FOREIGN PATENT DOCUMENTS

| CN | 204372429 | 6/2015 |
| CN | 105221871 | 1/2016 |

(Continued)

OTHER PUBLICATIONS

Chinese search report received by applicant dated May 15, 2019.
EPO search report completed Jan. 22, 2018 and dated Mar. 23, 2018.

*Primary Examiner* — David Bochna
(74) *Attorney, Agent, or Firm* — Edward T. Kennedy

(57) ABSTRACT

A connection assembly for an air maintenance tire system is provided. The air maintenance tire system includes an annular air tube, a valve housing and at least one connecting tube that is in fluid communication with the annular air tube and the valve housing. The connection assembly includes a connection housing that in turn includes a first port, a second port and a fluid passageway extending between the first port and the second port. A first compression fitting fluidly connects the annular air tube to the connection housing first port and a second compression fitting fluidly connects the connecting tube to the connection housing second port. The connection assembly enables a secure connection and fluid communication between the annular air tube and the connecting tube.

12 Claims, 14 Drawing Sheets

(51) Int. Cl.
*F16L 19/065* (2006.01)
*F16L 43/00* (2006.01)

(58) Field of Classification Search
USPC .......................................... 285/246, 247, 242
See application file for complete search history.

(56) References Cited

U.S. PATENT DOCUMENTS

| | | | |
|---|---|---|---|
| 1,682,992 A | 9/1928 | McKone | |
| 1,870,484 A * | 8/1932 | Basta | B60C 23/004 152/4 |
| 3,129,022 A * | 4/1964 | Avery | F16L 47/04 285/249 |
| 3,304,981 A | 2/1967 | Sheppard | |
| 3,756,632 A * | 9/1973 | Riggs | F16L 47/04 285/250 |
| 3,833,041 A | 9/1974 | Glad et al. | |
| 3,971,542 A * | 7/1976 | Lee, II | F16L 47/04 251/58 |
| 4,088,350 A | 5/1978 | Lee, II | |
| 4,614,372 A * | 9/1986 | Gschwind | F16L 47/04 285/250 |
| 4,632,435 A * | 12/1986 | Polyak | F16L 37/133 285/179 |
| 4,635,973 A * | 1/1987 | Sauer | F16L 33/22 285/242 |
| 4,922,984 A | 5/1990 | Dosjoub et al. | |
| 5,052,456 A | 10/1991 | Dosjoub | |
| 5,222,772 A * | 6/1993 | McGraw | F16L 19/063 285/243 |
| 6,209,804 B1 * | 4/2001 | Spriegel | F16L 33/223 239/373 |
| 6,641,177 B1 * | 11/2003 | Pinciaro | F16L 33/225 285/242 |
| 7,117,731 B2 | 10/2006 | Hrabal | |
| 7,370,889 B2 * | 5/2008 | Maunder | F16L 33/225 285/148.17 |
| 8,042,586 B2 | 10/2011 | Losey et al. | |
| 8,113,254 B2 | 2/2012 | Benedict | |
| 8,235,081 B2 | 8/2012 | Delgado et al. | |
| 8,875,762 B2 | 11/2014 | Hinque et al. | |
| 8,915,277 B2 | 12/2014 | Hinque et al. | |
| 8,985,171 B2 | 3/2015 | Hinque et al. | |
| 8,991,456 B2 | 3/2015 | Gobinath | |
| 9,387,737 B2 | 7/2016 | Welter et al. | |
| 9,533,534 B2 | 1/2017 | Lamgaday | |
| 2006/0157975 A1 * | 7/2006 | Fujii | F16L 47/04 285/247 |
| 2009/0294006 A1 | 12/2009 | Hrabal | |
| 2014/0174621 A1 | 6/2014 | Hinque et al. | |
| 2014/0353965 A1 | 12/2014 | Inoue et al. | |
| 2015/0059953 A1 | 3/2015 | Welter et al. | |
| 2015/0122390 A1 | 5/2015 | Durr | |
| 2015/0167874 A1 * | 6/2015 | Buerli | F16L 33/225 285/242 |
| 2016/0116096 A1 | 4/2016 | Fujii et al. | |
| 2017/0144492 A1 | 5/2017 | Lamgaday et al. | |
| 2017/0144493 A1 | 5/2017 | Lamgaday et al. | |
| 2017/0217260 A1 | 8/2017 | Lin et al. | |
| 2017/0361668 A1 * | 12/2017 | Bafana | B60C 29/005 |

FOREIGN PATENT DOCUMENTS

| | | | |
|---|---|---|---|
| DE | 3433318 | 3/1986 | |
| DE | 102007001279 | 7/2008 | |
| EP | 0203887 B1 * | 3/1991 | F16L 47/04 |
| EP | 0872678 A1 * | 10/1998 | F16L 47/04 |
| EP | 2985159 A1 | 2/2016 | |
| EP | 3199386 A1 * | 8/2017 | B60C 23/12 |
| FR | 2974881 | 11/2012 | |
| GB | 2087804 A * | 6/1982 | B60C 23/004 |
| RU | 2106978 | 3/1998 | |
| SE | 183890 | 5/1963 | |
| WO | 2003049958 | 6/2003 | |
| WO | 2005012009 A1 | 7/2004 | |
| WO | 2007134556 | 11/2007 | |
| WO | 2010008338 | 1/2010 | |

\* cited by examiner

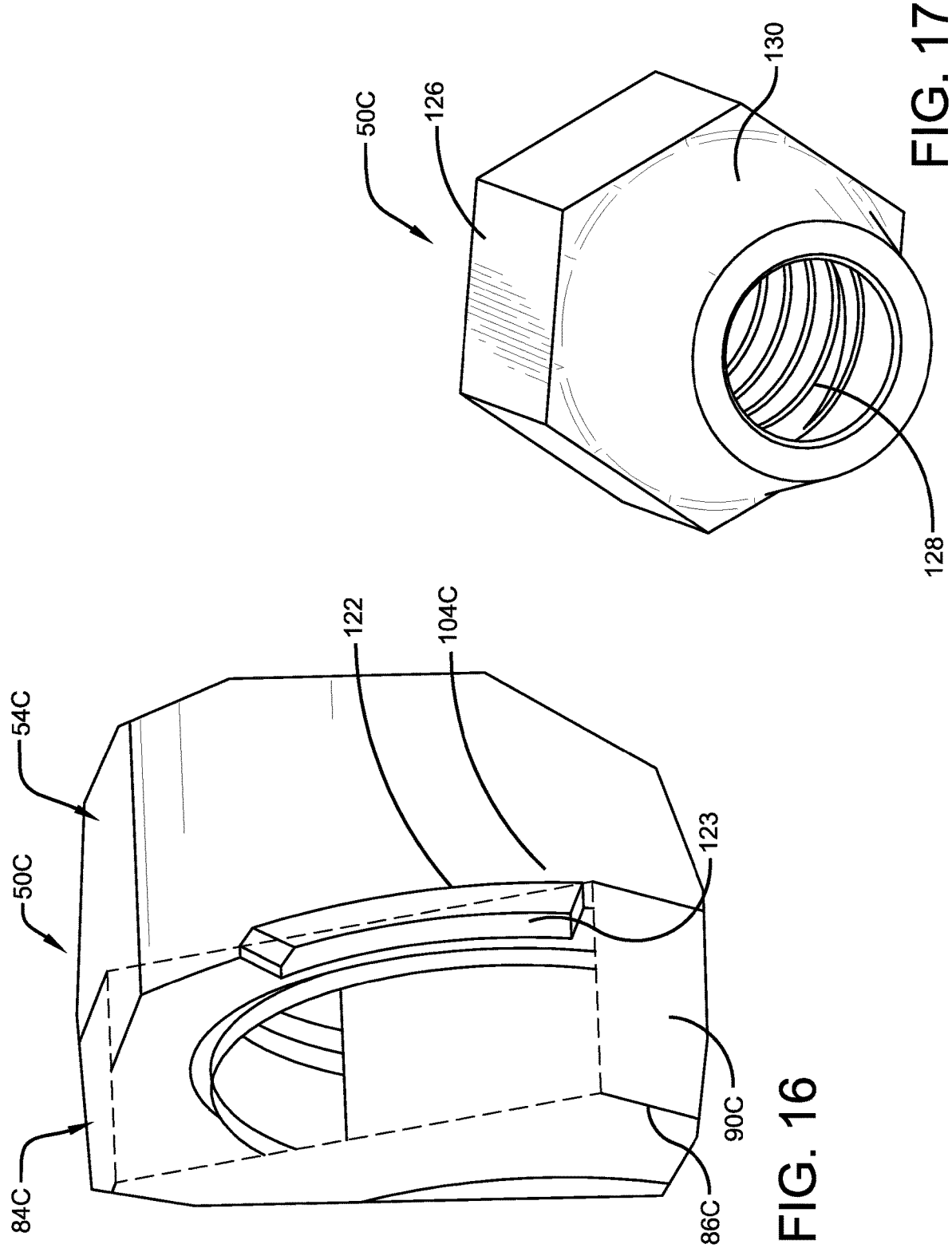

CONNECTION ASSEMBLY FOR AN AIR MAINTENANCE TIRE

FIELD OF THE INVENTION

The invention relates to air maintenance tire systems, which are systems that maintain appropriate air pressure within a pneumatic tire. More specifically, the invention relates to a pneumatic connection assembly for a valve stem-based air maintenance tire system. The invention is directed to a connection assembly that provides a secure pneumatic connection between an annular tube and connecting tubes of an air maintenance tire system.

BACKGROUND OF THE INVENTION

Conventional pneumatic tires are designed to perform for relatively long periods of time. In many cases, automobile tires are now expected to have a useful service life of 30,000, 50,000 or 70,000 miles. However, even long-life pneumatic tires are subject to air pressure losses due to puncture by nails and other sharp objects, temperature changes, and/or diffusion of air through the tire itself.

Since air diffusion reduces tire pressure over time, pneumatic tires may repeatedly become underinflated. Accordingly, drivers must in turn repeatedly act to maintain recommended air pressures in the vehicle tires to avoid reduced fuel economy, tire life, and/or vehicle braking and handling performance. Tire pressure monitoring systems (TPMS) are automated systems that have been proposed to warn drivers when the air pressure in the vehicle tires is significantly low. Such systems, however, remain dependent upon a driver taking remedial action, when warned, to re-inflate a tire to the recommended pressure. It had thus been desirable in the prior art to incorporate an air maintenance feature within a pneumatic tire that would maintain a predetermined or recommended air pressure without requiring driver intervention.

To this end, air maintenance tire (AMT) systems have been developed. An AMT system typically includes one or more pumps or pumping assemblies that act to increase the air pressure in the vehicle tires as needed. An example of one such system is a valve stem-based air maintenance tire system described in U.S. patent application Ser. No. 14/946,005, which is owned by the same Assignee as the present invention, that is, The Goodyear Tire & Rubber Company.

In such AMT systems, and particularly valve stem-based AMT systems, an annular air tube is disposed in a sidewall of the tire and is sequentially flattened or squeezed by the tire footprint as the tire rotates, which directs air to a valve housing. The valve housing is disposed within a wheel rim and is fluidly connected to a tire valve stem, which in turn is in fluid communication with the tire cavity. To enable the fluid communication of air from the annular air tube to the valve housing, one or more connecting tubes extend between the annular air tube and the valve housing.

The structure or assembly that fluidly connects the annular air tube to the connecting tubes is an important part of a valve-stem based AMT system, as the structure must maintain a secure fluid connection in a dynamic environment. It is therefore desirable to provide a connection assembly that enables a secure fluid connection between the annular air tube and the connecting tubes of an air maintenance tire.

SUMMARY OF THE INVENTION

According to an aspect of an exemplary embodiment of the invention, a connection assembly for an air maintenance tire system is provided. The air maintenance tire system includes an annular air tube, a valve housing and at least one connecting tube that is in fluid communication with the annular air tube and the valve housing. The connection assembly includes a connection housing that includes a first port, a second port and a fluid passageway extending between the first port and the second port. A first compression fitting fluidly connects the annular air tube to the connection housing first port and a second compression fitting fluidly connects the connecting tube to the connection housing second port. The connection assembly enables fluid communication between the annular air tube and the connecting tube.

BRIEF DESCRIPTION OF THE DRAWINGS

The invention will be described by way of example and with reference to the accompanying drawings, in which:

FIG. 16 is an enlarged fragmentary perspective view of selected components of the connection assembly shown in FIG. 13 in an assembled state;

FIG. 17 is a perspective view of a component of the connection assembly shown in FIG. 13;

Similar numerals refer to similar parts throughout the drawings.

DETAILED DESCRIPTION OF THE INVENTION

It is to be understood that the term inboard or inboardly is referred to herein as a direction corresponding to the axially inner surface or side of a tire, and the term outboard or outboardly is referred to herein as a direction corresponding to the axially outer surface or side of a tire. The term axially inwardly refers to an axial direction that is toward the center plane of a tire, and the term axially outwardly refers to an axial direction that is away from the center plane of a tire. The term radially inwardly refers to a radial direction that is toward the central axis of rotation of a tire, and the term radially outwardly refers to a radial direction that is away from the central axis of rotation of a tire.

Figure 1:
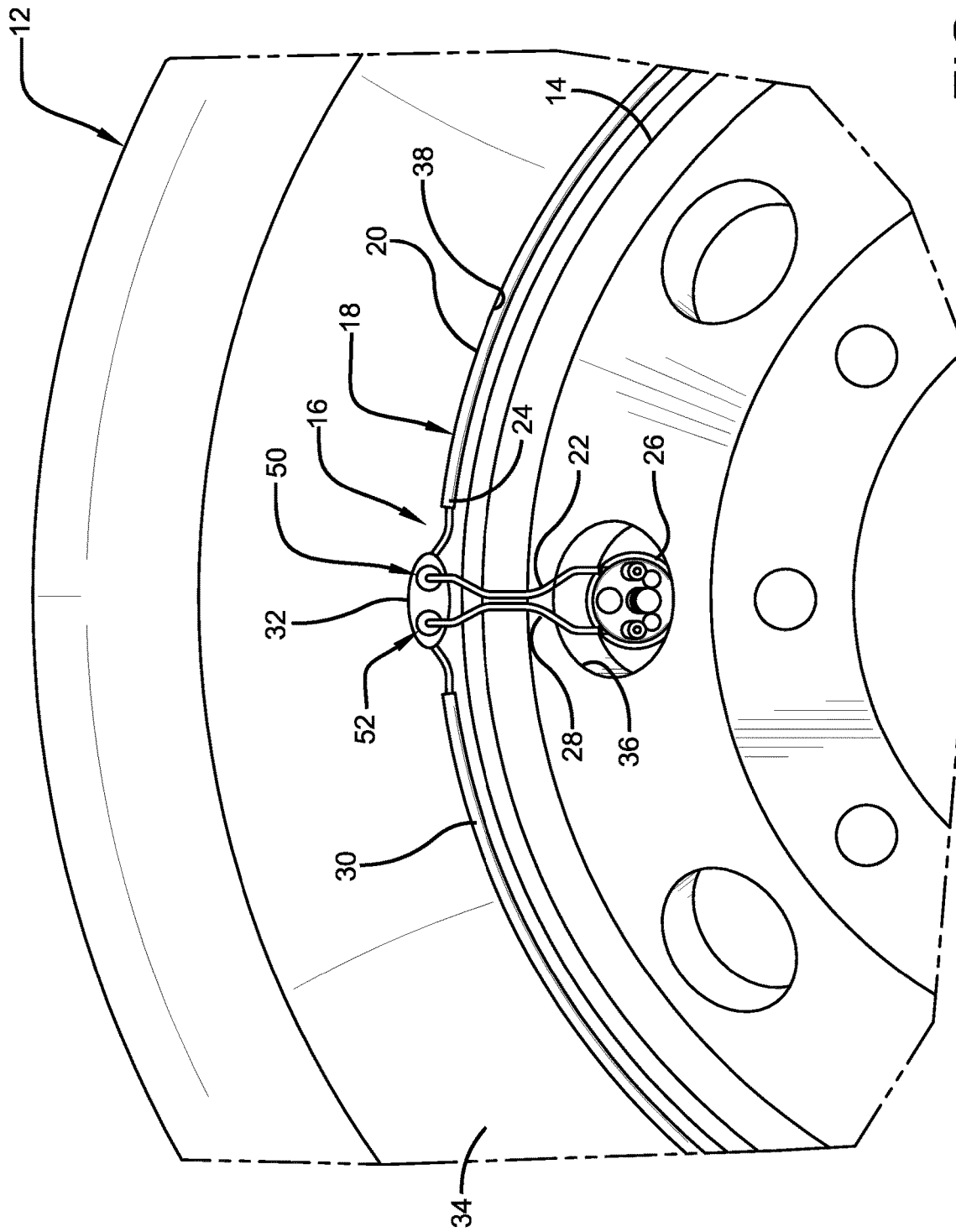
FIG. 1 is a fragmentary elevational view of a side of a tire including components of a valve stem-based air maintenance tire system.
Figure 2:
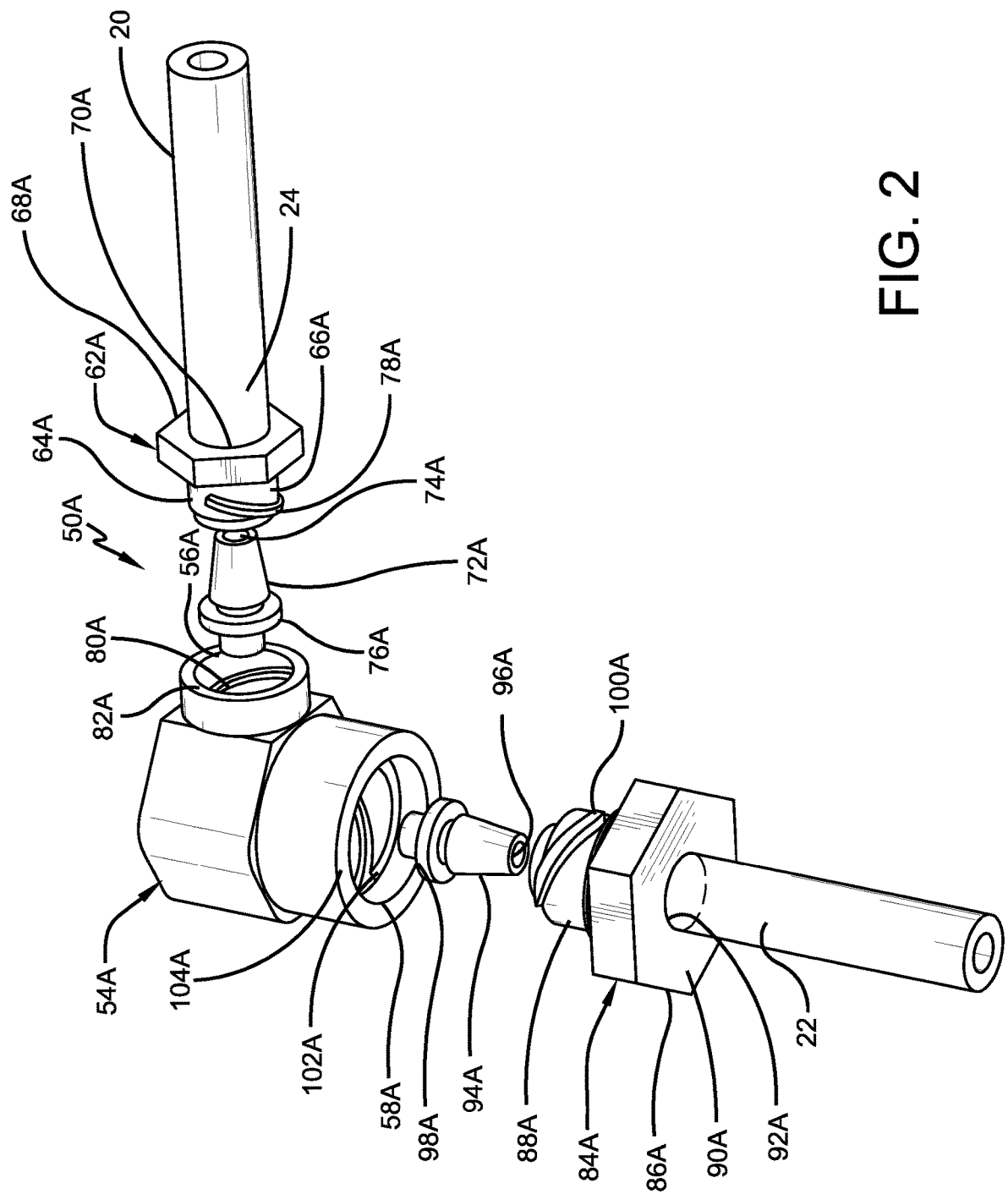
FIG. 2 is an exploded fragmentary perspective view of a first exemplary embodiment of the connection assembly for an air maintenance tire of the present invention.
Figure 3:
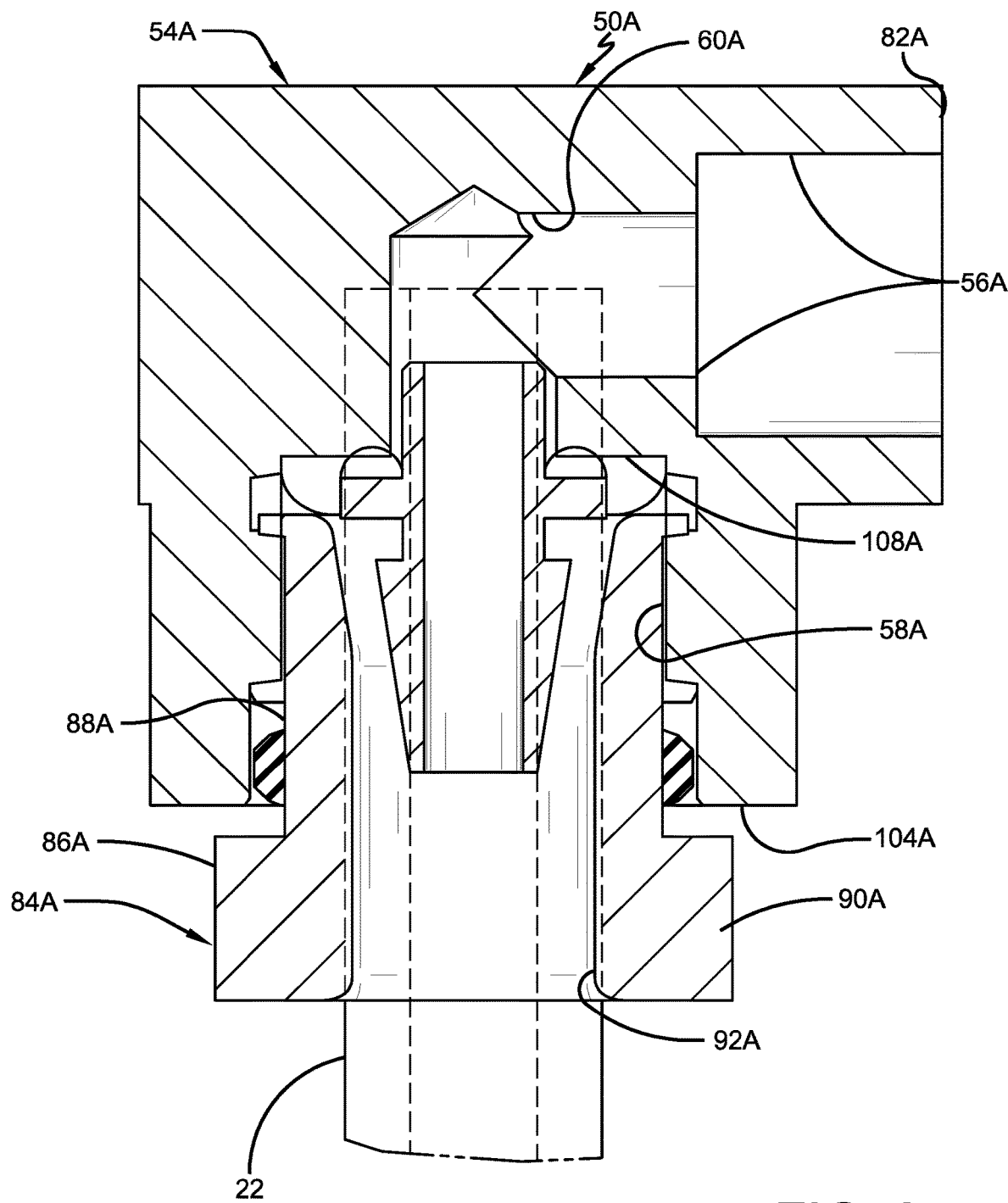
FIG. 3 is a schematic cross-sectional representation of an assembled view of the connection assembly shown in FIG. 2.
Figure 5:
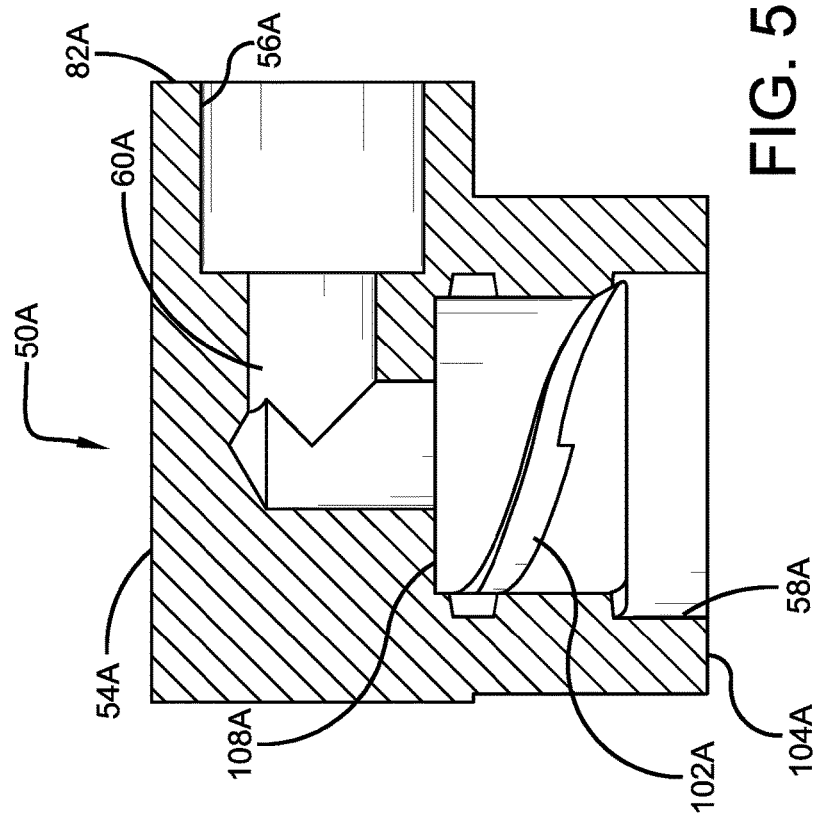
FIG. 5 is a cross-sectional representation of the component shown in FIG. 4.
Figure 4:
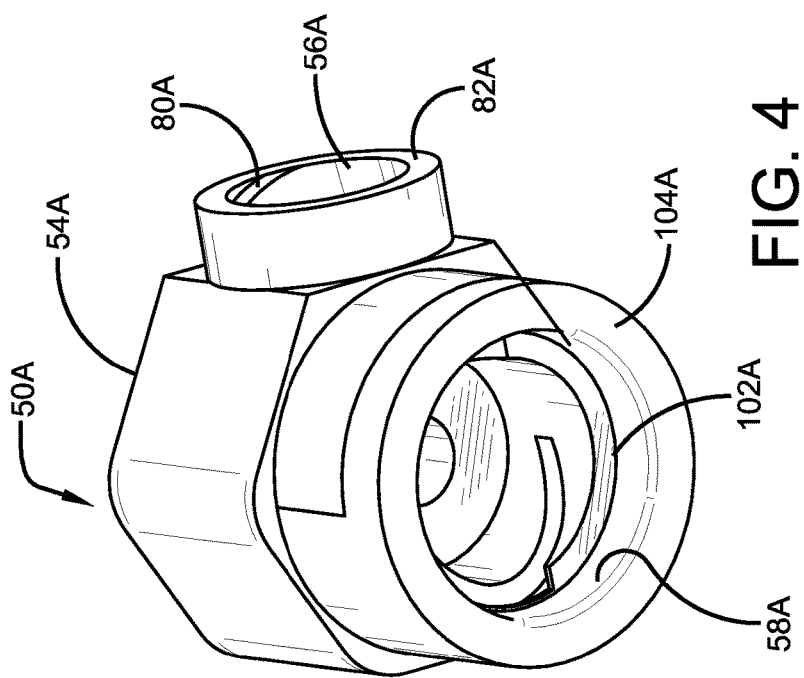
FIG. 4 is a perspective view of a component of the connection assembly shown in FIG. 2.
Figure 7:
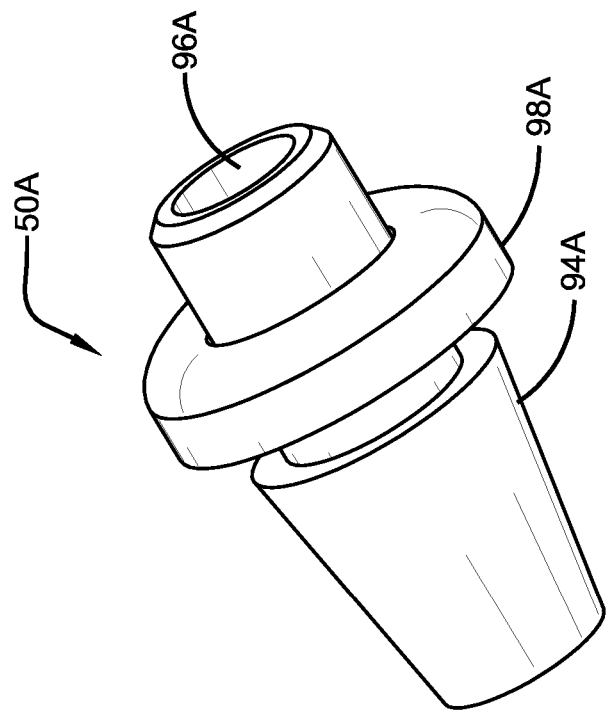
FIG. 7 is a perspective view of a component of the connection assembly shown in FIG. 2.
Figure 6:
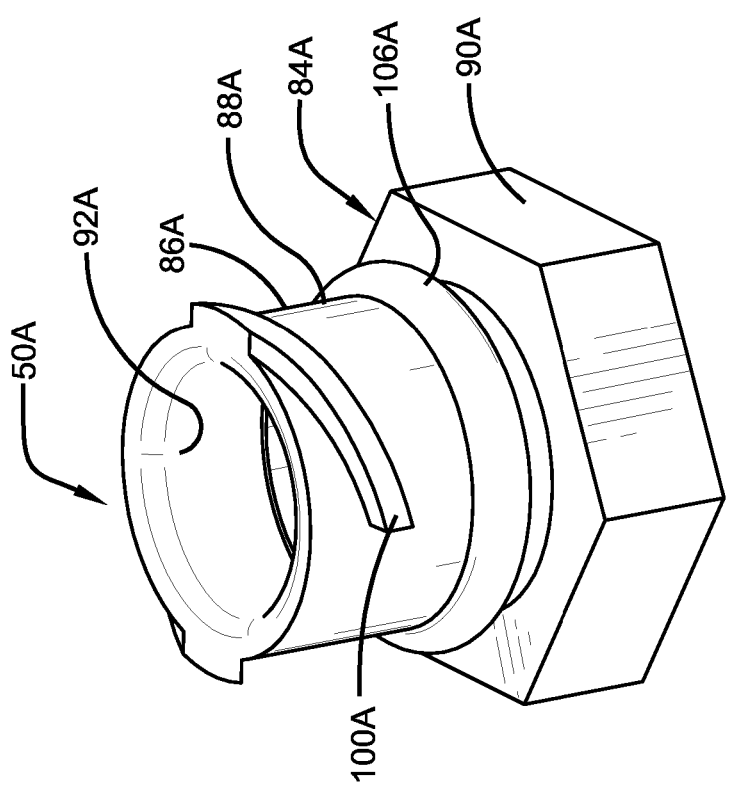
FIG. 6 is a perspective view of a component of the connection assembly shown in FIG. 2.
Figure 8:
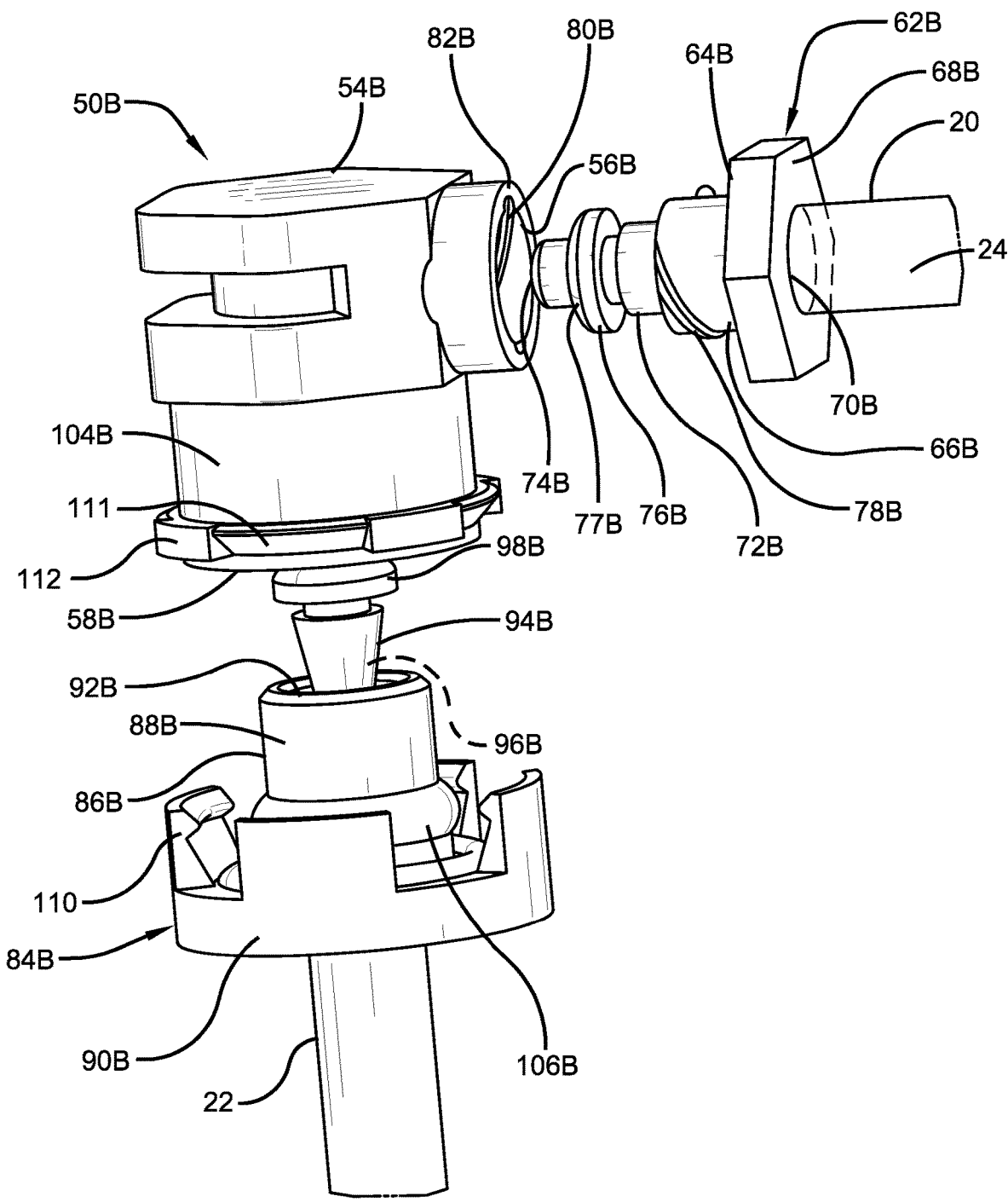
FIG. 8 is an exploded fragmentary perspective view of a second exemplary embodiment of the connection assembly for an air maintenance tire of the present invention.
Figure 10:
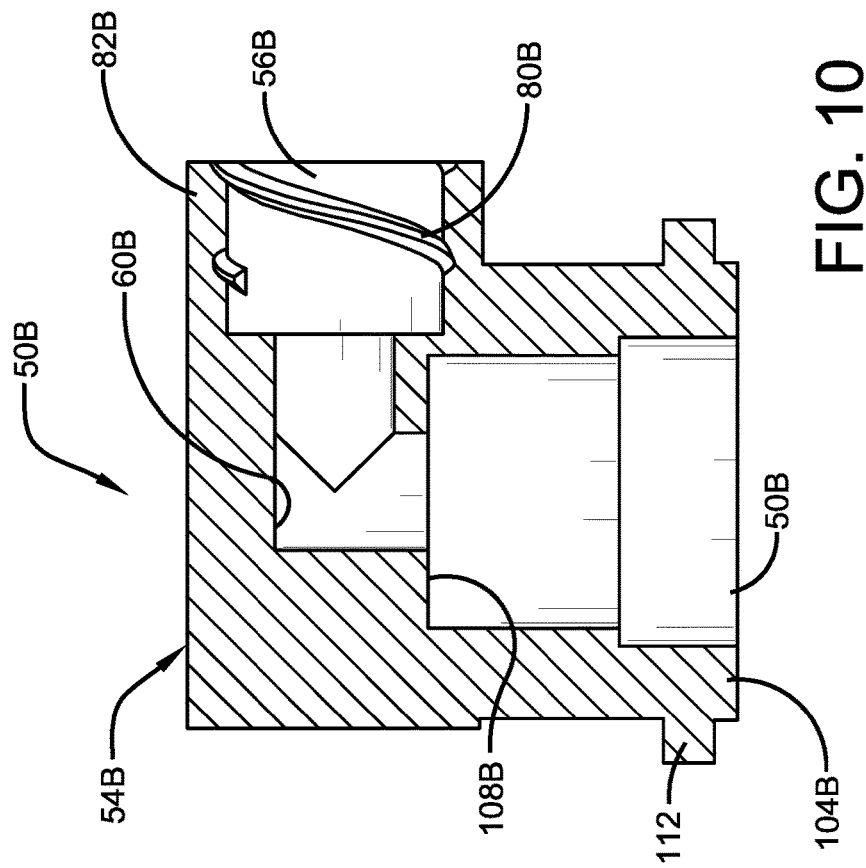
FIG. 10 is a cross-sectional representation of the component shown in FIG. 9.
Figure 9:
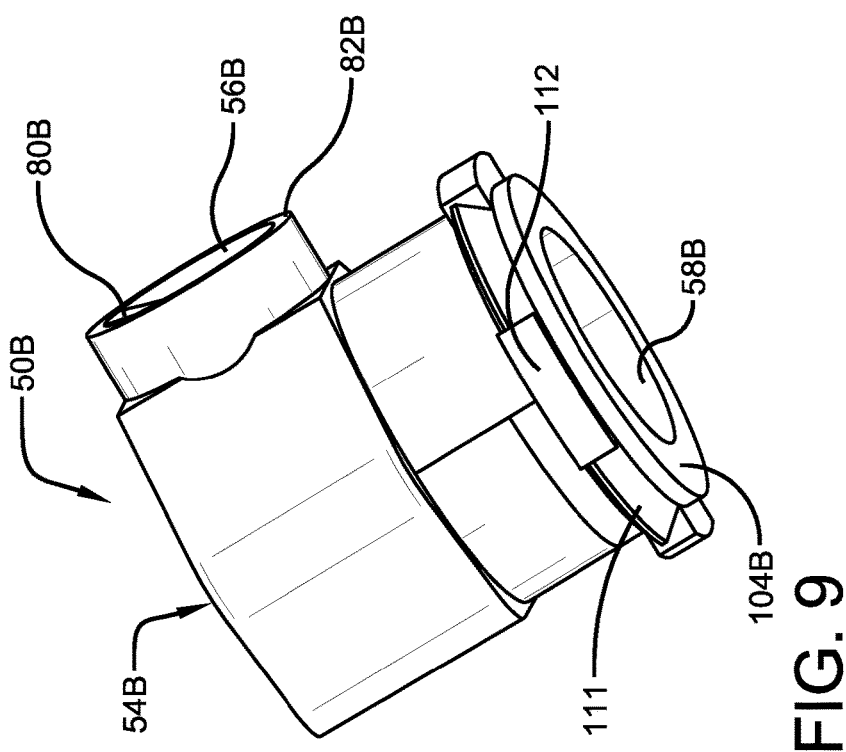
FIG. 9 is a perspective view of a component of the connection assembly shown in FIG. 8.
Figure 12:
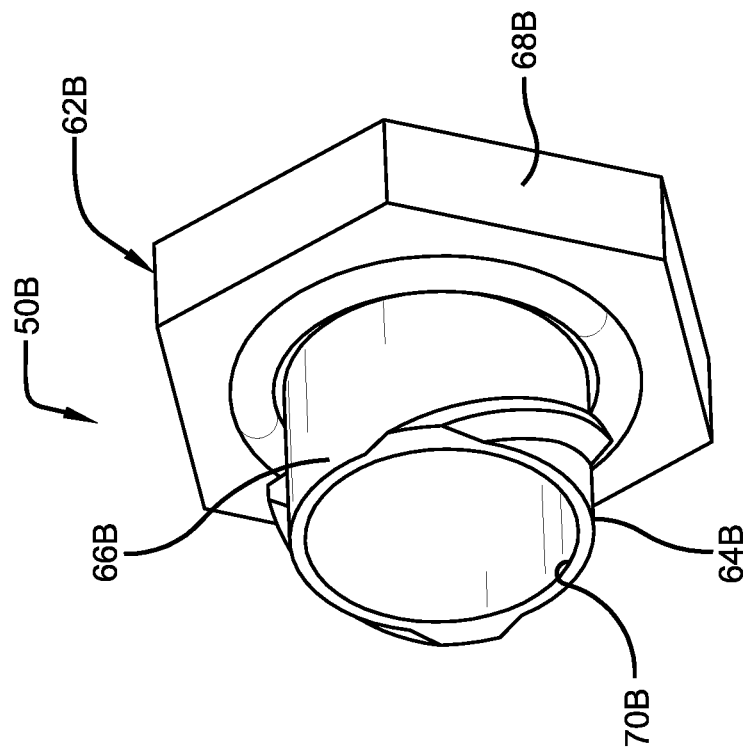
FIG. 12 is a perspective view of a component of the connection assembly shown in FIG. 8.
Figure 11:
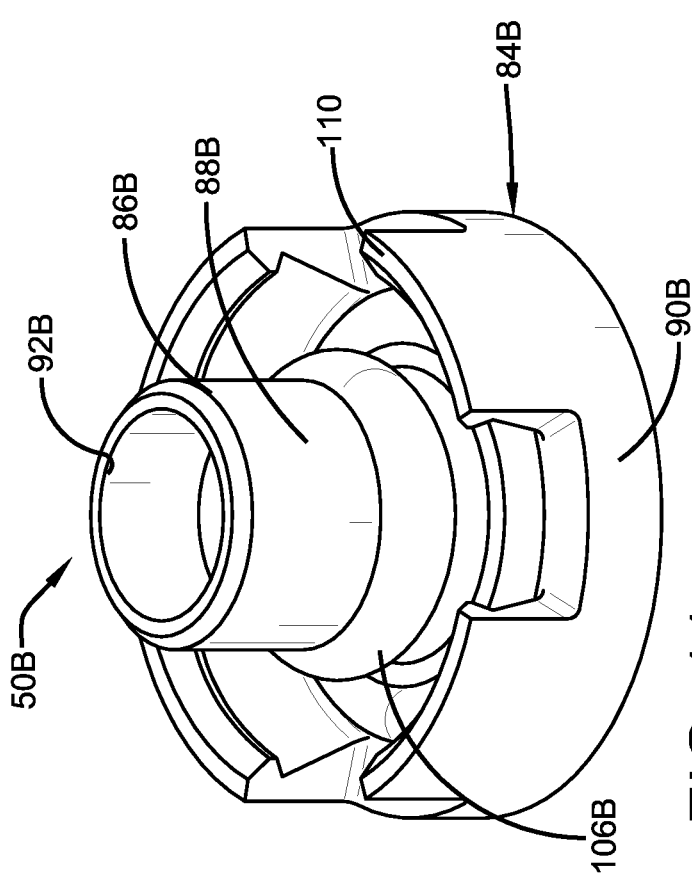
FIG. 11 is a perspective view of a component of the connection assembly shown in FIG. 8.
Figure 13:
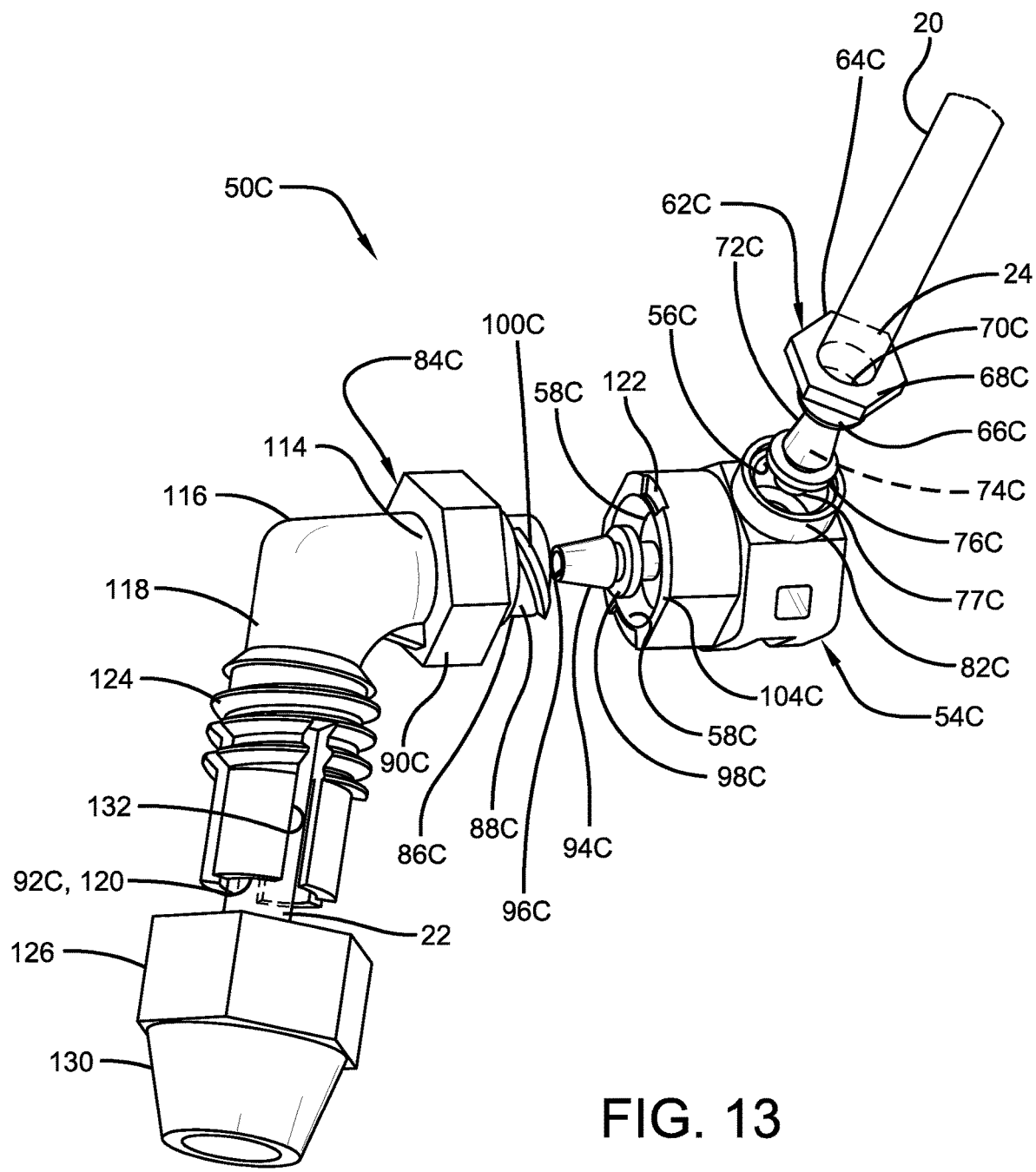
FIG. 13 is an exploded fragmentary perspective view of a third exemplary embodiment of the connection assembly for an air maintenance tire of the present invention.
Figure 15:
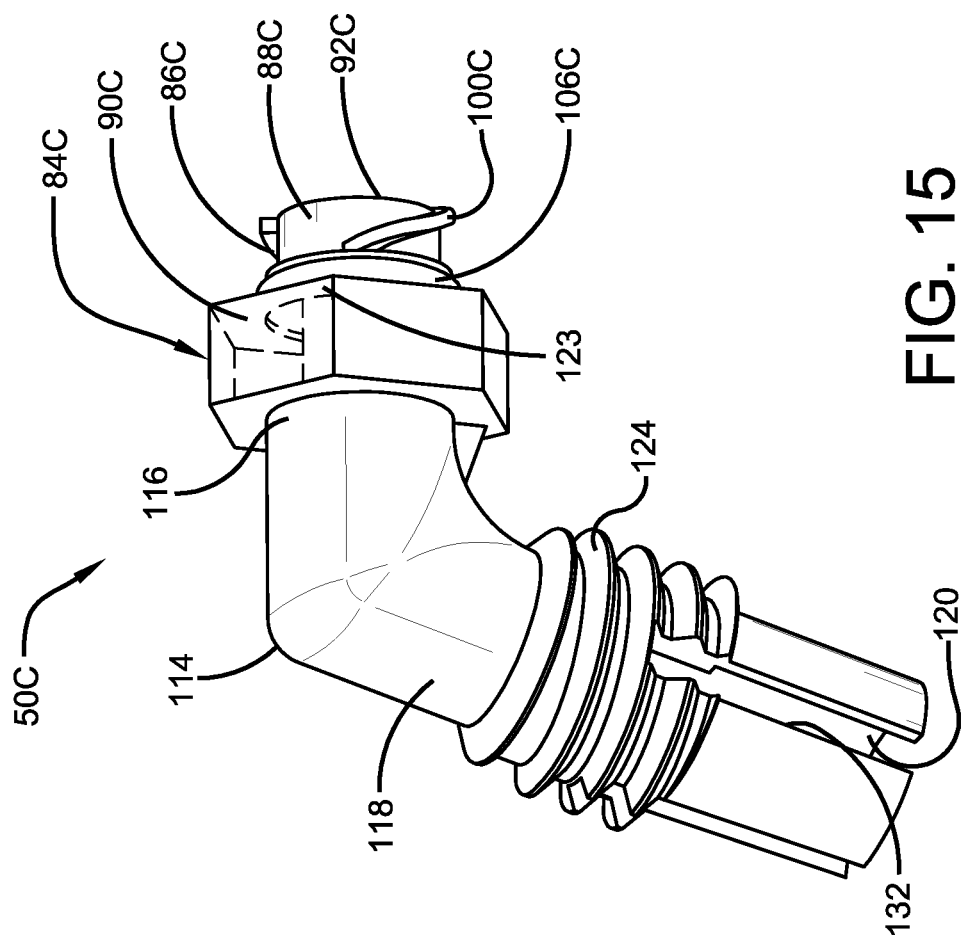
FIG. 15 is a perspective view of a component of the connection assembly shown in FIG. 13.
Figure 14:
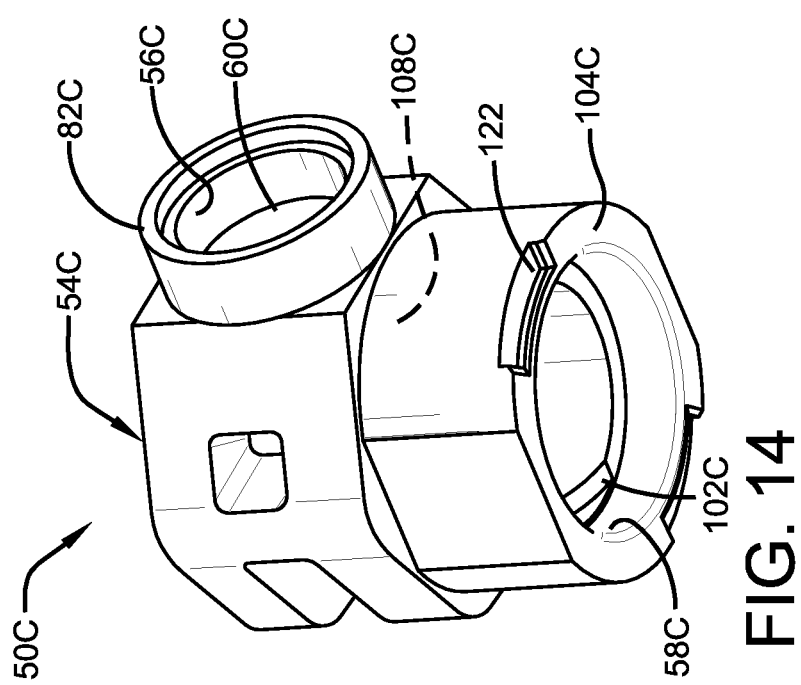
FIG. 14 is a perspective view of a component of the connection assembly shown in FIG. 13.
Figure 18:
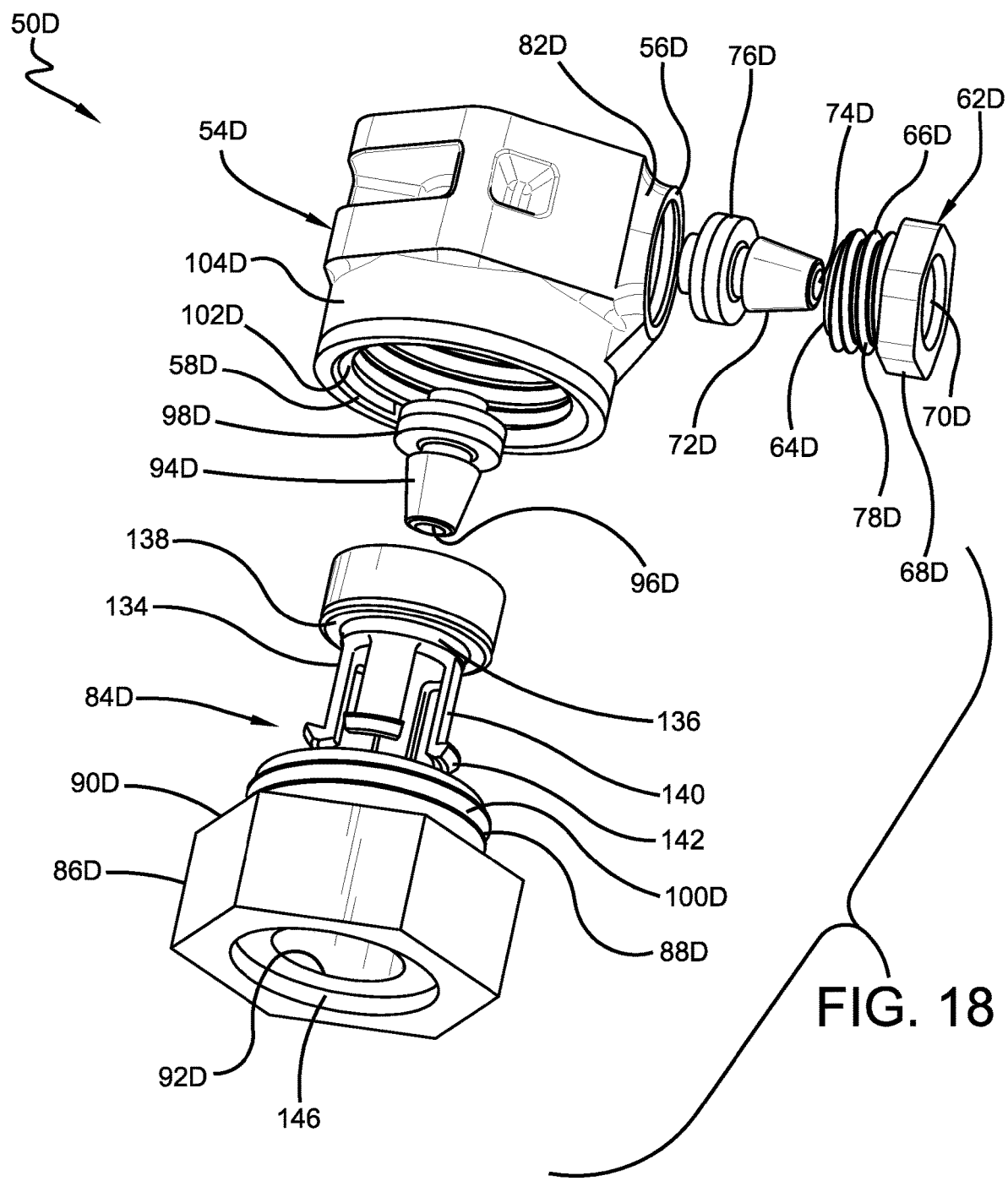
FIG. 18 is an exploded perspective view of components of a fourth exemplary embodiment of the connection assembly for an air maintenance tire of the present invention.
Figure 19:
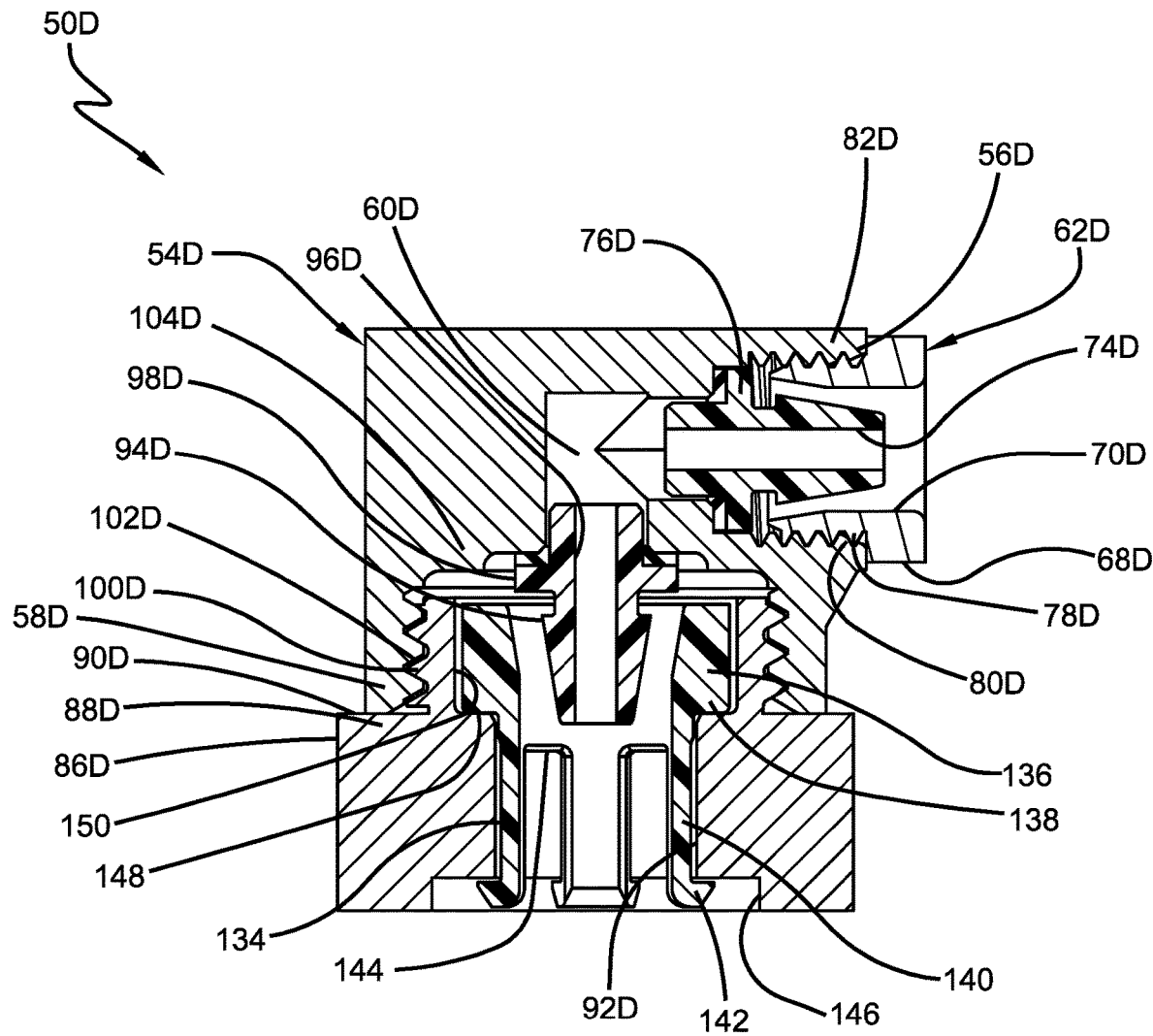
FIG. 19 is a cross-sectional representation of an assembled view of the components of the connection assembly shown in FIG. 18.
Figure 20:
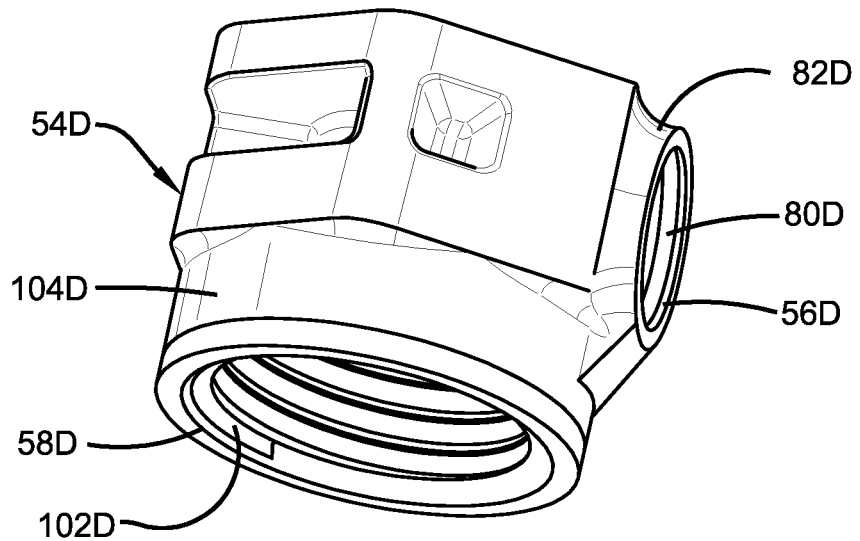
FIG. 20 is a perspective view of a component of the connection assembly shown in FIG. 18.
Figure 21:
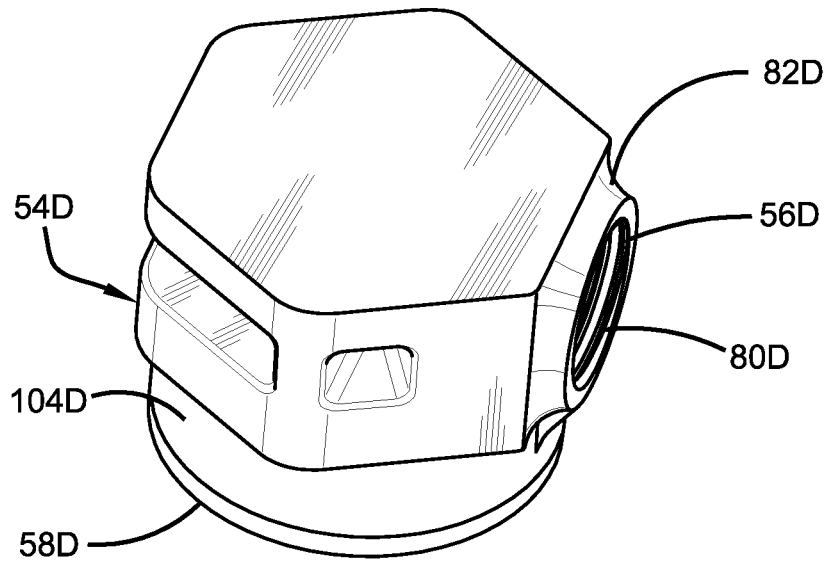
FIG. 21 is another perspective view of the component shown in FIG. 20.

Turning to FIG. 1, a tire 12 is mounted on a rim 14 in a conventional manner as known to those skilled in the art and defines a cavity (not shown). An exemplary air maintenance tire (AMT) system, such as a valve stem-based air maintenance tire system, is indicated at 16. The AMT system 16 includes a peristaltic pump assembly 18. The peristaltic pump assembly 18 includes an annular air tube 20 that is received in an annular groove 38 formed in a sidewall 34 of the tire 12 and/or rim 14, and in turn encloses an annular passageway (not shown).

A first connecting tube 22 attaches to a first end 24 of the annular air tube 20 and fluidly connects the first end of the annular air tube to a valve housing 26 of the pump assembly 18. A second connecting tube 28 attaches to a second end 30 of the annular air tube 20 and fluidly connects the second end of the annular air tube to the valve housing 26. While the AMT system 16 preferably includes two connecting tubes 22 and 28, one connecting tube or more than two connecting tubes may be employed, depending on specific design considerations.

When the tire 12 rotates under load along a ground surface, the annular air tube 20 is sequentially flattened or squeezed at the tire footprint. The sequential flattening of the annular air tube 20 and its passageway, segment by segment, directs air to the valve housing 26. A tire valve stem (not shown), preferably including a check valve, is fluidly connected to the valve housing 26 and is in fluid communication with the tire cavity. When the air pressure is sufficient against the check valve and the air pressure within the tire cavity is below a set pressure level, air passes into the tire cavity. When the air pressure level within the tire cavity is at or above the set pressure, the check valve closes and air from the pump assembly 18 is vented by a relief valve in the valve housing 26 to atmosphere.

As seen in FIG. 1, the valve housing 26 of the pump assembly 18 is disposed within the rim 14. The connecting tubes 22, 28 pass through an opening 36 formed in the rim 14 and extend to a fairly rigid elastomer or polymer mounting member 32, which is referred to as a dome. The dome 32 is secured to the sidewall 34 of the tire 12, and provides a secure mounting location in the tire sidewall 34 for a first connection assembly 50, which fluidly connects the first connecting tube 22 to the first end 24 of the annular air tube 20, and a second connection assembly 52, which fluidly connects the second connecting tube 28 to the second end 30 of the annular air tube.

For the purpose of convenience, and due to the similar structure and function of the first connection assembly 50 and the second connection assembly 52, only one connection assembly shall be described below. Therefore, reference shall be made to a single connection assembly 50, with the understanding that such reference includes the first connection assembly and the second connection assembly 52. In addition, four exemplary embodiments of the connection assembly 50 are described below, with FIGS. 2 through 7 showing a first exemplary embodiment 50A, FIGS. 8 through 12 showing a second exemplary embodiment 50B, FIGS. 13 through 17 showing a third exemplary embodiment 50C, and FIGS. 18 through 21 showing a fourth exemplary embodiment 50D.

Referring now to FIGS. 2 through 7, the first exemplary embodiment of the connection assembly 50A is shown. The connection assembly 50A includes a housing 54A, which is formed with a first port 56A and a second port 58A. A fluid pathway 60A extends between the first port 56A and the second port 58A, enabling air to pass through the housing 54A. A portion of the housing 54A adjacent the second port 58A preferably extends outwardly past the surface of the dome 32 (FIG. 1) when the AMT system 16 is in an assembled state.

The first port 56A connects to a selected one of the first end 24 or the second end 30 of the annular air tube 20 with a compression fitting 62A. For the purpose of convenience, reference shall be made to the first end 24 of the annular air tube 20 with the understanding that such reference also applies to the second end 30 of the annular air tube. The compression fitting 62A includes a nut 64A that is formed with a cylindrical body 66A, a shoulder 68A, and a central bore 70A. The nut 64A slides over the end 24 of the annular air tube 20 and the tube passes through the central bore 70A. Because the annular air tube 20 preferably is formed of a flexible polymer, the compression fitting may cause the inner diameter of the tube to collapse without internal support. As a result, a rigid conically-shaped insert 72A is disposed inside the inner diameter of the end 24 of the annular air tube 20. The insert 72A is formed with a central bore 74A, which enables fluid communication between the first port 56A and the annular air tube 20. The insert 72A is also formed with a shoulder 76A, which provides a seat for the end 24 of the annular air tube 20. The insert 72A cooperates with the nut 64A to capture and thus provide a secure compression fitting for the annular air tube 20.

The nut 64A includes threads 78A formed on the cylindrical body 66A. The threads 78A on the nut 64A engage mating grooves or slots 80A that are formed in a wall 82A of the first port 56A of the housing 54A. To secure the compression fitting 62A to the first port 56A, the nut 64A is inserted into the first port, whereupon the threads 78A of the nut engage the slots 80A of the port wall 82A and the nut is rotated. The shoulder 76A of the nut 64A is formed with wrench flats, enabling the nut to be rotated by a standard wrench or by hand. The slots 80A preferably are double-starting slots, so that the threads 78A engage the slots upon rotating the nut 64A and/or the housing 54A about 180 degrees or less. In addition, the threads 78A preferably fully engage the slots 80A with a one-half or one-quarter turn of the nut 64A and/or the housing 54A. Such a construction of the housing 54A and the nut 64A desirably minimizes rotation or twisting of the annular air tube 20 and the housing to securely connect the tube to the housing.

The second port 58A connects to a selected one of the connecting tubes 22 and 28 with a compression fitting 84A. For the purpose of convenience, reference shall be made to the first connecting tube 22, with the understanding that such reference also applies to the second connecting tube 28. The compression fitting 84A includes a nut 86A that is formed with a cylindrical body 88A, a shoulder 90A and a central bore 92A. The nut 86A slides over the end of the connecting tube 22 and the tube passes through the central bore 92A. Because the connecting tube 22 preferably is formed of a flexible polymer, the compression fitting may cause the inner diameter of the tube to collapse without internal support. As a result, a rigid conically-shaped insert 94A is disposed inside the inner diameter of the end of the connecting tube 22. The insert 94A is formed with a central bore 96A, which enables fluid communication between the second port 58A and the connecting tube 22. The insert 94A is also formed with a shoulder 98A, which provides a seat for the end of the connecting tube 22. The insert 94A cooperates with the nut 86A to capture and thus provide a secure compression fitting for the connecting tube 22.

The nut 86A includes threads 100A formed on the cylindrical body 88A. The threads 100A on the nut 86A engage mating grooves or slots 102A that are formed in a wall 104A of the second port 58A of the housing 54A. To secure the compression fitting 84A to the second port 58A, the nut 86A is inserted into the second port, whereupon the threads 100A of the nut engage the slots 102A of the port wall 104A and the nut is rotated. The shoulder 90A of the nut 86A is formed with wrench flats, enabling the nut to be rotated by a standard wrench or by hand. The slots 102A preferably are double-starting slots, so that the threads 100A engage the slots upon rotating the nut 86A and/or the housing 54A about 180 degrees or less. In addition, the threads 100A preferably fully engage the slots 102A with a one-half or one-quarter turn of the nut 86A and/or the housing 54A. Such a construction of the housing 54A and the nut 86A desirably minimizes rotation or twisting of the connecting tube 22 and the housing to securely connect the tube to the housing.

Preferably, the port wall 104A of the housing 54A is formed with twist-lock tabs that prevent rotation of the nut 86A once it is engaged in the second port 58A. The port wall 104A is also formed with a step-off feature 108A, so that once the nut 86A is fully inserted into the second port 58A, the step-off forms a radial seal for optimum fluid communication. In addition, the threads 100A and the slots 102A are formed with an interference fit to ensure that the nut 86A does not disengage from the second port 58A during operation. Moreover, the nut 86A includes sealing means 106A, such as an overmolded seal or an O-ring, which provides a radial seal to ensure a secure fluid connection between the nut and the second port 58A.

Turning now to FIGS. 8 through 12, the second exemplary embodiment of the connection assembly 50B is shown. The connection assembly 50B includes a housing 54B, which is formed with a first port 56B and a second port 58B. A fluid pathway 60B extends between the first port 56B and the second port 58B, enabling air to pass through the housing 54B. A portion of the housing 54B adjacent the second port 58B preferably extends outwardly past the surface of the dome 32 (FIG. 1) when the AMT system 16 is in an assembled state.

The first port 56B connects to a selected one of the first end 24 or the second end 30 of the annular air tube 20 with a compression fitting 62B. For the purpose of convenience, reference shall be made to the first end 24 of the annular air tube 20 with the understanding that such reference also applies to the second end 30 of the annular air tube. The compression fitting 62B includes a nut 64B that is formed with a cylindrical body 66B, a shoulder 68B and a central bore 70B.

The nut 64B slides over the end 24 of the annular air tube 20 and the tube passes through the central bore 70B. Because the annular air tube 20 preferably is formed of a flexible polymer, the compression fitting may cause the inner diameter of the tube to collapse without internal support. As a result, a rigid conically-shaped insert 72B is disposed inside the inner diameter of the end 24 of the annular air tube 20. The insert 72B is formed with a central bore 74B, which enables fluid communication between the first port 56B and the annular air tube 20. The insert 72B is also formed with a shoulder 76B, which provides a seat for the end 24 of the annular air tube 20. The insert 72B cooperates with the nut 64B to capture and thus provide a secure compression fitting for the annular air tube 20. The insert 72B preferably includes an overmolded semi-circular seal 77B that provides a face seal between the insert and the first port 56B.

The nut 64B includes threads 78B formed on the cylindrical body 66B. The threads 78B on the nut 64B engage mating grooves or slots 80B that are formed in a wall 82B of the first port 56B of the housing 54B. To secure the compression fitting 62B to the first port 56B, the nut 64B is inserted into the first port, whereupon the threads 78B of the nut engage the slots 80B of the port wall 82B and the nut is rotated. The shoulder 76B of the nut 64B is formed with wrench flats, enabling the nut to be rotated by a standard wrench or by hand. The slots 80B preferably are double-starting slots, so that the threads 78B engage the slots upon rotating the nut 64B and/or the housing 54B about 180 degrees or less. In addition, the threads 78B preferably fully engage the slots 80B with a one-half or one-quarter turn of the nut 64B and/or the housing 54B. Such a construction of the housing 54B and the nut 64B desirably minimizes rotation or twisting of the annular air tube 20 and the housing to securely connect the tube to the housing.

The second port 58B connects to a selected one of the connecting tubes 22 and 28 with a compression fitting 84B. For the purpose of convenience, reference shall be made to the first connecting tube 22, with the understanding that such reference also applies to the second connecting tube 28. The compression fitting 84B includes a nut 86B that is formed with a cylindrical body 88B, a shoulder 90B and a central bore 92B. The nut 86B slides over the end of the connecting tube 22 and the tube passes through the central bore 92B. Because the connecting tube 22 preferably is formed of a flexible polymer, the compression fitting may cause the inner diameter of the tube to collapse without internal support. As a result, a rigid conically-shaped insert 94B is disposed inside the inner diameter of the end of the connecting tube 22.

The insert 94B is formed with a central bore 96B, which enables fluid communication between the second port 58B and the connecting tube 22. The insert 94B is also formed with a shoulder 98B, which provides a seat for the end of the connecting tube 22. The insert 94B cooperates with the nut 86B to capture and thus provide a secure compression fitting for the connecting tube 22. The insert 94B preferably includes an overmolded semi-circular seal 77B that provides a face seal between the insert and the second port 56B.

The nut 86B includes locking tabs 110 that extend from the shoulder 90B and surround a portion of the cylindrical body 88B. The locking tabs 110 engage a mating feature 111, such as a circumferential lip, formed on the outer circumference of a wall 104B of the second port 58B of the housing 54B. To secure the compression fitting 84B to the second port 58B, the cylindrical body 88B of the nut 86B is inserted into the second port, with the locking tabs 110 of the nut sliding over and interlocking with the lip 111 on the housing 54B. The outer circumference of the wall 104B is also formed with tabs 112 that block rotation of the tabs 110 on the nut 86B, thereby preventing undesirable rotation of the nut. Such a construction of the housing 54B and the nut 86B desirably minimizes rotation or twisting of the connecting tube 22 and the housing to securely connect the tube to the housing.

The port wall 104B is formed with a step-off feature 108B, so that once the nut 86B is fully inserted into the second port 58B, the step-off forms a radial seal for optimum fluid communication. In addition, the nut 86B preferably includes sealing means 106B, such as an overmolded seal or an O-ring, which provides a radial seal to ensure a secure fluid connection between the nut and the second port 58B. As mentioned above, during assembly, the cylindrical body 88B of the nut 86B is pressed into the second port 58B, which compresses the sealing means 106B, and the locking tabs 110 engage the lip 111 on the housing 54B. Once the nut 86B is released, it pushes up into the step-off 108B, thereby locking the nut and preventing it from loosening in dynamic conditions. The locking tabs 110 and mating lip 111 enable easy connection of the connecting tube 22 to the housing 54B and ready retraction of this connection upon the application of significant force, which ensures that the nut 86B will not disengage during operation.

Referring now to FIGS. 13 through 17, the third exemplary embodiment of the connection assembly 50C is shown. The connection assembly 50C includes a housing 54C, which is formed with a first port 56C and a second port 58C. A fluid pathway 60C extends between the first port 56C and the second port 58C, enabling air to pass through the housing 54C. A portion of the housing 54C adjacent the second port 58C preferably extends outwardly past the surface of the dome 32 (FIG. 1) when the AMT system 16 is in an assembled state.

The first port 56C connects to a selected one of the first end 24 or the second end 30 of the annular air tube 20 with a compression fitting 62C. For the purpose of convenience, reference shall be made to the first end 24 of the annular air tube 20 with the understanding that such reference also applies to the second end 30 of the annular air tube. The compression fitting 62C includes a nut 64C that is formed with a cylindrical body 66C, a shoulder 68C and a central bore 70C. The nut 64C slides over the end 24 of the annular air tube 20 and the tube passes through the central bore 70C. Because the annular air tube 20 preferably is formed of a flexible polymer, the compression fitting may cause the inner diameter of the tube to collapse without internal support. As a result, a rigid conically-shaped insert 72C is disposed inside the inner diameter of the end 24 of the annular air tube 20. The insert 72C is formed with a central bore 74C, which enables fluid communication between the first port 56C and the annular air tube 20. The insert 72C is also formed with a shoulder 76C, which provides a seat for the end 24 of the annular air tube 20. The insert 72C cooperates with the nut 64C to capture and thus provide a secure compression fitting for the annular air tube 20.

The cylindrical body 66C of the nut 64C preferably is smooth, and is formed with an interference fit or compression fit relative to the first port 56C. The cylindrical body 66C is inserted into the first port 56C until the shoulder 68C contacts the port wall 82C. To secure the connection of the nut 64C to the housing 54C, the shoulder 68C is joined to the port wall 82C by means such as ultrasonic welding, an adhesive, or the like. Such joining enables a one-time rapid assembly that creates a hermetic seal which removes the need for any additional seals at the first port 56C. Such a construction of the housing 54C and the nut 64C desirably minimizes rotation or twisting of the annular air tube 20 and the housing to securely connect the tube to the housing.

The second port 58C connects to a selected one of the connecting tubes 22 and 28 with a compression fitting 84C. For the purpose of convenience, reference shall be made to the first connecting tube 22, with the understanding that such reference also applies to the second connecting tube 28. The compression fitting 84C includes an elbow 114 that is formed with a first end 116, a second end 118 and a central bore 120. The elbow 114 preferably is formed with an angle that is between about 60 degrees and ninety degrees, and more preferably, about 75 degrees.

The first end 116 of the elbow 114 includes a nut 86C. The connecting tube 22 slides through the central bore 120 of the elbow 114, with the nut 86C being at the end of the connecting tube. Because the connecting tube 22 preferably is formed of a flexible polymer, the compression fitting at the nut 86C may cause the inner diameter of the tube to collapse without internal support. As a result, a rigid conically-shaped insert 94C is disposed inside the inner diameter of the end of the connecting tube 22. The insert 94C is formed with a central bore 96C, which enables fluid communication between the second port 58C and the connecting tube 22. The insert 94C is also formed with a shoulder 98C, which provides a seat for the end of the connecting tube 22. The insert 94C cooperates with the nut 86C to capture and thus provide a secure compression fitting for the connecting tube 22.

The nut 86C includes a cylindrical body 88C and threads 100C that are formed on the cylindrical body. The threads 100C engage mating grooves or slots 102C that are formed in a wall 104C of the second port 58C of the housing 54C. For the initial connection of the elbow 114 to the second port 58C, the threads 100C of the nut engage the slots 102C of the port wall 104C and the nut is rotated. The nut 86C includes a shoulder 90C that is formed with wrench flats, thereby enabling the nut to be rotated by a standard wrench or by hand. The slots 102C preferably are double-starting slots, so that the threads 100C engage the slots upon rotating the nut 86C and/or the housing 54C about 180 degrees or less. In addition, the threads 100C preferably fully engage the slots 102C with a one-half or one-quarter turn of the nut 86C and/or the housing 54C. Such a construction of the housing 54C and the nut 86C desirably minimizes rotation or twisting of the elbow 114, connecting tube 22 and the housing when connecting the tube to the housing.

Preferably, the port wall 104C of the housing 54C and the shoulder 90C of the nut 86C are formed with mating features 122 and 123, respectively, which form a twist-lock to prevent rotation of the nut once it is engaged in the second port 58C. The port wall 104C may also be formed with a step-off feature 108C, so that once the nut 86C is fully inserted into the second port 58C, the step-off forms a radial seal for optimum fluid communication. In addition, the threads 100C and the slots 102C preferably are formed with an interference fit to ensure that the nut 86C does not disengage from the second port 58C during operation. Moreover, the nut 68C includes sealing means 106C, such as an O-ring or an overmolded seal, which provides a radial seal to ensure a secure fluid connection between the nut and the second port 58C.

The elbow 114 of the compression fitting 84C protects and supports the flexible connecting tube 22 to maintain the position of the connecting tube, improve the fatigue life of the tube and reduce abrasion of the tube. To secure the connecting tube 22 at the second end 118 of the elbow 114, the second end is formed with threads 124. A collar 126 is formed with mating threads 128, thereby enabling the collar to thread onto and seat on the second end 118 of the elbow 114. The connecting tube 22 optionally includes protective wrapping (not shown). To securely engage the connecting tube 22 and/or the protective wrapping, the second end 118 of the elbow 114 is formed with features 132 such as slits. In addition, the collar 126 is formed with a cone 130, which engages the second end 118 of the elbow 114 at the slits. When the collar 126 engages the elbow threads 124, the cone 130 and the slits 132 cooperate to create a compressive force on the connecting tube 22 and/or the protective wrapping to secure the position of the tube, while enabling deflection of the second end 118 of the elbow 114 to prevent a collapse of the tube. Alternatively, the cone 130 may be formed with features such as slits to enable such compression and deflection to secure the position of the connecting tube 22 without collapsing the tube.

Referring now to FIGS. 18 through 21, the fourth exemplary embodiment of the connection assembly 50D is shown. The connection assembly 50D includes a housing 54D, which is formed with a first port 56D and a second port 58D. A fluid pathway 60D extends between the first port 56D and the second port 58D, enabling air to pass through the housing 54D. A portion of the housing 54D adjacent the second port 58D preferably extends outwardly past the surface of the dome 32 (FIG. 1) when the AMT system 16 is in an assembled state.

The first port 56D connects to a selected one of the first end 24 or the second end 30 of the annular air tube 20 with a compression fitting 62D. For the purpose of convenience, reference shall be made to the first end 24 of the annular air tube 20 with the understanding that such reference also applies to the second end 30 of the annular air tube. The compression fitting 62D includes a nut 64D that is formed with a cylindrical body 66D, a shoulder 68D, and a central bore 70D. The nut 64D slides over the end 24 of the annular air tube 20 (FIG. 2) and the tube passes through the central bore 70D. Because the annular air tube 20 preferably is formed of a flexible polymer, the compression fitting may cause the inner diameter of the tube to collapse without internal support. As a result, a rigid conically-shaped insert 72D is disposed inside the inner diameter of the end 24 of the annular air tube 20. The insert 72D is formed with a central bore 74D, which enables fluid communication between the first port 56D and the annular air tube 20. The insert 72D is also formed with a shoulder 76D, which provides a seat for the end 24 of the annular air tube 20. The insert 72D cooperates with the nut 64D to capture and thus provide a secure compression fitting for the annular air tube 20.

The nut 64D includes threads 78D formed on the cylindrical body 66D. The threads 78D on the nut 64D engage mating grooves or slots 80D that are formed in a wall 82D of the first port 56D of the housing 54D. To secure the compression fitting 62D to the first port 56D, the nut 64D is inserted into the first port, whereupon the threads 78D of the nut engage the slots 80D of the port wall 82D and the nut is rotated. The shoulder 76D of the nut 64D is formed with wrench flats, enabling the nut to be rotated by a standard wrench or by hand. The slots 80D may optionally be double-starting slots, so that the threads 78D may engage the slots upon rotating the nut 64D and/or the housing 54D about 180 degrees or less. In addition, the threads 78D may optionally fully engage the slots 80D with a one-half or one-quarter turn of the nut 64D and/or the housing 54D. Such a construction of the housing 54D and the nut 64D desirably minimizes rotation or twisting of the annular air tube 20 and the housing to securely connect the tube to the housing.

The second port 58D connects to a selected one of the connecting tubes 22 and 28 with a compression fitting 84D that includes a nut 86D and a sleeve 134. For the purpose of convenience, reference shall be made to the first connecting tube 22 (FIG. 2), with the understanding that such reference also applies to the second connecting tube 28. The nut 86D of the compression fitting 84D is formed with a cylindrical body 88D, a shoulder 90D and a central bore 92D. The sleeve 134 is formed with a body 136, a shoulder 138, compressible legs 140 having projecting tabs 142, and a central bore 144. The connecting tube 22 passes through the central bore 92D of the nut 86D and through the central bore 144 of the sleeve 134.

Because the connecting tube 22 preferably is formed of a flexible polymer, the compression fitting may cause the inner diameter of the tube to collapse without internal support. As a result, a rigid conically-shaped insert 94D is disposed inside the inner diameter of the end of the connecting tube 22. The insert 94D is formed with a central bore 96D, which enables fluid communication between the second port 58D and the connecting tube 22. The insert 94D is also formed with a shoulder 98D, which provides a seat for the end of the connecting tube 22. The insert 94D cooperates with the nut 86D and the sleeve 134 to capture and thus provide a secure compression fitting for the connecting tube 22.

After the connecting tube 22 has passed through the central bore 92D of the nut 86D, passed through the central bore 144 of the sleeve 134, and received the insert 94D, the tube and the insert seat in the central bore of the sleeve. The sleeve 134 is then inserted into the nut central bore 92D, causing the compressible legs 140 to compress against the connecting tube 22 while passing through the nut central bore. The central bore 92D of the nut 86D is formed with a step 148, so that a portion of the bore has a larger diameter 150 than the remainder of the bore. As a result, the compressible legs 140 pass through the central bore 92D until the shoulder 138 on the sleeve 134 engages the step 148 formed in the nut 86D. The sleeve shoulder 138 seats within the larger diameter portion of the bore 150, and the tabs 142 engage the body 88D of the nut 86D in a surface recess 146 formed in the nut. In this manner, the sleeve 134 is received in the body 88D of the nut 86D in a snap fit that maintains compression on the connecting tube 22. The snap fit is also a swivel fit, as the connection enables the sleeve 134 to statically secure the connecting tube 22, while allowing separate rotation of the nut 86D for tightening to the housing 54D. In this manner, rotation of the connecting tube 22 is desirably reduced when the nut 86D is secured to the housing 54D.

To secure the nut 86D to the housing 54D, the nut includes threads 100D formed on the cylindrical body 88D. The threads 100D on the nut 86D engage mating grooves or slots 102D that are formed in a wall 104D of the second port 58D of the housing 54D. To secure the compression fitting 84D to the second port 58D, the nut 86D bearing the sleeve 134 is inserted into the second port, whereupon the threads 100D of the nut engage the slots 102D of the port wall 104D and the nut is rotated. The shoulder 90D of the nut 86D is formed with wrench flats, enabling the nut to be rotated by a standard wrench or by hand. The slots 102D optionally are double-starting slots, so that the threads 100D may engage the slots upon rotating the nut 86D and/or the housing 54D about 180 degrees or less. In addition, the threads 100D may optionally fully engage the slots 102D with a one-half or one-quarter turn of the nut 86D and/or the housing 54D. Such a construction of the housing 54D, the nut 86D and the sleeve 134 desirably minimizes rotation or twisting of the connecting tube 22 and the housing to securely connect the tube to the housing.

In addition, the threads 100D and the slots 102D may optionally be formed with an interference fit to ensure that the nut 86D does not disengage from the second port 58D during operation. Moreover, the nut 86D optionally includes sealing means, such as an overmolded seal or an O-ring, which provides a radial seal to ensure a secure fluid connection between the nut and the second port 58D.

As mentioned above, the structure and function of the four embodiments of the connection assembly 50A, 50B, 50C and 50D of the present invention apply to the first connection assembly 50 and the second connection assembly 52. The structure of the connection assembly 50 and 52 enables a secure fluid connection between the annular air tube 20 and the connecting tubes 22 and 28 in the dynamic environment of an air maintenance tire system 16.

The connection assembly 50 and 52 provides a high-pressure seal that readily accommodates tire pressures of about 150 pounds per square inch and above, while minimizing undesirable twisting of the annular air tube 20 and the connecting tubes 22 and 28. In addition, the connection assembly 50 and 52 includes small components that create a minimal profile, which is desirable for an AMT system, and may be installed with no special tools. Moreover, the connection assembly 50 and 52 includes a symmetric design that enables the compression fitting for each connecting tube 22 and 28 to be assembled in any orientation.

The present invention also includes a method of forming and a method of using a connection assembly 50 and 52 in an air maintenance tire. Each method includes steps in accordance with the description that is presented above and shown in FIGS. 1 through 21.

It is to be understood that the structure of the above-described connection assembly 50 and 52 may be altered or rearranged, or components known to those skilled in the art omitted or added, without affecting the overall concept or operation of the invention. The invention has been described with reference to preferred embodiments. Potential modifications and alterations will occur to others upon a reading and understanding of this description. It is to be understood that all such modifications and alterations are included in the scope of the invention as set forth in the appended claims, or the equivalents thereof.

What is claimed is:

1. A connection assembly for an air maintenance tire system, the air maintenance tire system including an annular air tube, a valve housing and at least one connecting tube in fluid communication with the annular air tube and the valve housing, the connection assembly comprising:
   a connection housing, the connection housing including:
      a first port;
      a second port; and
      a fluid passageway extending between the first port and the second port;
   a first compression fitting fluidly connecting the annular air tube to the connection housing first port, the first compression fitting including a nut that engages an end of the annular air tube, the nut including a cylindrical body formed with at least one of an interference fit and a compression fit relative to the first port, wherein the nut is secured to a wall of the first port by at least one of ultrasonic welding and an adhesive; and
   a second compression fitting fluidly connecting the connecting tube to the connection housing second port, whereby the connection assembly enables the fluid communication between the annular air tube and the connecting tube.

2. The connection assembly for an air maintenance tire system of claim 1, wherein the nut includes threads that engage mating slots formed in a wall of the first port of the connection housing.

3. The connection assembly for an air maintenance tire system of claim 1, wherein the first compression fitting includes a rigid insert disposed inside an end of the annular air tube.

4. The connection assembly for an air maintenance tire system of claim 1, wherein the nut includes sealing means that provide a seal between the nut and the first port.

5. A connection assembly for an air maintenance tire system, the air maintenance tire system including an annular air tube, a valve housing and at least one connecting tube in fluid communication with the annular air tube and the valve housing, the connection assembly comprising:
   a connection housing, the connection housing including:
      a first port;
      a second port; and
      a fluid passageway extending between the first port and the second port;
   a first compression fitting fluidly connecting the annular air tube to the connection housing first port; and
   a second compression fitting fluidly connecting the connecting tube to the connection housing second port, wherein the second compression fitting includes a nut that engages an end of the connecting tube, the second compression fitting including a sleeve that engages the end of the connecting tube and the nut, whereby the connection assembly enables the fluid communication between the annular air tube and the connecting tube.

6. The connection assembly for an air maintenance tire system of claim 5, wherein the nut includes threads that engage mating slots formed in a wall of the second port of the connection housing.

7. The connection assembly for an air maintenance tire system of claim 5, wherein the second compression fitting includes a rigid insert disposed inside an end of the connecting tube.

8. The connection assembly for an air maintenance tire system of claim 5, wherein the nut includes sealing means that provide a seal between the nut and the second port.

9. The connection assembly for an air maintenance tire system of claim 5, wherein a wall of the second port and the nut are formed with mating twist-lock features.

10. The connection assembly for an air maintenance tire system of claim 5, wherein the nut includes locking tabs that engage a mating feature formed on an outer circumference of a wall of the second port.

11. A connection assembly for an air maintenance tire system, the air maintenance tire system including an annular air tube, a valve housing and at least one connecting tube in fluid communication with the annular air tube and the valve housing, the connection assembly comprising:
   a connection housing, the connection housing including:
      a first port;
      a second port; and a fluid passageway extending between the first port and the second port;

a first compression fitting fluidly connecting the annular air tube to the connection housing first port; and a second compression fitting fluidly connecting the connecting tube to the connection housing second port, wherein the second compression fitting includes an elbow that engages the connecting tube, the elbow including a first end including a nut that engages an end of the connecting tube and a second end that receives a collar, whereby the connection assembly enables the fluid communication between the annular air tube and the connecting tube.

12. The connection assembly for an air maintenance tire system of claim 11, wherein the collar includes a cone that creates a compressive force on at least one of the elbow and the connecting tube.

* * * * *